(12) United States Patent
Iida

(10) Patent No.: US 10,367,345 B2
(45) Date of Patent: Jul. 30, 2019

(54) TEMPERATURE DETECTION DEVICE

(71) Applicant: TOYOTA JIDOSHA KABUSHIKI KAISHA, Toyota-shi, Aichi-ken (JP)

(72) Inventor: Tomoaki Iida, Okazaki (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 255 days.

(21) Appl. No.: 15/464,975

(22) Filed: Mar. 21, 2017

(65) Prior Publication Data

US 2017/0294771 A1 Oct. 12, 2017

(30) Foreign Application Priority Data

Apr. 6, 2016 (JP) ................................. 2016-076731

(51) Int. Cl.
| | |
|---|---|
| *H02H 1/00* | (2006.01) |
| *G01K 13/00* | (2006.01) |
| *H02H 7/20* | (2006.01) |
| *G01K 1/02* | (2006.01) |
| *G01K 3/00* | (2006.01) |
| *G01K 7/24* | (2006.01) |

(52) U.S. Cl.
CPC ........... *H02H 1/0007* (2013.01); *G01K 1/026* (2013.01); *G01K 3/005* (2013.01); *G01K 7/24* (2013.01); *G01K 13/00* (2013.01); *H02H 7/20* (2013.01); *G01K 2205/00* (2013.01)

(58) Field of Classification Search
CPC ........ H02H 1/0007; H02H 7/20; G01K 1/026; G01K 3/005; G01K 7/24; G01K 13/00; G01K 2205/00

USPC ........................................................ 361/93.8
See application file for complete search history.

(56) References Cited

U.S. PATENT DOCUMENTS

| 6,118,237 A | 9/2000 | Kikuchi et al. |
| 2005/0231169 A1* | 10/2005 | Seo ......................... G01K 7/24 |
| | | 320/150 |
| 2013/0049973 A1* | 2/2013 | Matsumoto ........... B60L 3/0046 |
| | | 340/636.12 |

(Continued)

FOREIGN PATENT DOCUMENTS

| JP | 2000-023307 A | 1/2000 |
| JP | 2000-278802 A | 10/2000 |

(Continued)

*Primary Examiner* — Kevin J Comber
(74) *Attorney, Agent, or Firm* — Oliff PLC

(57) ABSTRACT

A protection circuit includes a first sensor connecting path having a first overcurrent protection element and connecting one of terminals of a first temperature sensor to a sensor input circuit; a second sensor connecting path having a second overcurrent protection element and connecting one of terminals of a second temperature sensor to the sensor input circuit; a rectifying element connecting the first sensor connecting path, whose normal voltage is higher than a reference voltage line, to the reference voltage line in a section between the first overcurrent protection element and the sensor input circuit; and an overvoltage protection element connecting the second sensor connecting path, whose normal voltage is higher than the reference voltage line, to the reference voltage line in a section between the second overcurrent protection element and the sensor input circuit.

7 Claims, 10 Drawing Sheets

(56) References Cited

U.S. PATENT DOCUMENTS

2013/0342939 A1   12/2013   Itou et al.
2014/0268443 A1 *  9/2014   Nassar .................... H02H 9/02
                                                                    361/56

FOREIGN PATENT DOCUMENTS

JP            2014-007883 A      1/2014
WO    WO-2014118625 A1 *    8/2014   .............. H02M 1/32

* cited by examiner

TEMPERATURE DETECTION DEVICE

INCORPORATION BY REFERENCE

The disclosure of Japanese Patent Application No. 2016-076731 filed on Apr. 6, 2016 including the specification, drawings and abstract is incorporated herein by reference in its entirety.

BACKGROUND

1. Field of the Disclosure

The disclosure relates to a temperature detection device.

2. Description of Related Art

A motor drive system for a vehicle is described in Japanese Patent Application Publication No. 2000-278802 (JP 2000-278802 A). This system includes a battery, a motor that is driven by electric power from the battery, and an inverter that converts the electric power between the battery and the motor. Positive and negative electrodes of the battery are connected to the inverter via relays, respectively.

SUMMARY

In a configuration, like the system described in JP 2000-278802 A, in which a battery or another DC (direct current) power supply is connected to an inverter or another load via relays, it is considered to monitor the temperatures of the respective relays in order, for example, to prevent overheating of the relays. In this case, there is needed a temperature detection device that can detect the temperatures of the respective relays. This temperature detection device can be configured using a plurality of temperature sensors and a sensor input circuit. Each temperature sensor is disposed adjacent to a corresponding one of the relays and outputs a detection signal corresponding to the temperature of the corresponding relay. By connecting terminals of the temperature sensors to at least one of a power supply voltage line and a reference voltage line, the sensor input circuit supplies necessary electric power to the temperature sensors and suppresses noise that occurs in detection signals. The detection signals of the temperature sensors are input to a monitoring circuit including a microprocessor and so on via the sensor input circuit.

In the temperature detection device described above, there is a possibility of the occurrence of unintended continuity between the temperature sensor and the relay that are disposed adjacent to each other. In this regard, between the relay connected to a positive electrode of the DC power supply and the relay connected to a negative electrode of the DC power supply, there is a potential difference caused by the DC power supply. Accordingly, if, with respect to such two relays, unintended continuity between the temperature sensors and the relays occur simultaneously, there is a possibility that a short-circuit current may flow in a path extending from one of the temperature sensors, through the sensor input circuit, to the other temperature sensor. This is not limited to the case where the temperatures of a plurality of relays are detected. That is, even in the case where the temperatures of a plurality of members, other than relays, having a potential difference in a DC circuit are detected, the same thing as described above can occur when unintended continuity between the DC circuit and a plurality of temperature sensors occur simultaneously.

The disclosure provides a technique that can protect a sensor input circuit when unintended continuity occur simultaneously at a plurality of temperature sensors in a temperature detection device that detects the temperatures of a plurality of members in a DC circuit.

An aspect of the disclosure is a temperature detection device including: a first temperature sensor that is disposed adjacent to a first member in a DC circuit; a second temperature sensor that is disposed adjacent to a second member in the DC circuit, the second member having a higher potential than the first member; a sensor input circuit that connects a first terminal of the first temperature sensor and a second terminal of the second temperature sensor to a power supply voltage line and that connects a third terminal of the first temperature sensor and a fourth terminal of the second temperature sensor to a reference voltage line; and a protection circuit that is provided between the first and second temperature sensors and the sensor input circuit, wherein the protection circuit includes: a first sensor connecting path having a first overcurrent protection element and connecting the first terminal of the first temperature sensor to the power supply voltage line of the sensor input circuit; a second sensor connecting path having a second overcurrent protection element and connecting the second terminal of the second temperature sensor to the power supply voltage line of the sensor input circuit; a third sensor connecting path having a third overcurrent protection element and connecting the third terminal of the first temperature sensor to the reference voltage line of the sensor input circuit; a fourth sensor connecting path having a fourth overcurrent protection element and connecting the fourth terminal of the second temperature sensor to the reference voltage line of the sensor input circuit; a rectifying element connecting the first sensor connecting path to the reference voltage line in a section between the first overcurrent protection element and the sensor input circuit, the first sensor connecting path having a normal voltage higher than the reference voltage line; and an overvoltage protection element connecting the second sensor connecting path to the reference voltage line in a section between the second overcurrent protection element and the sensor input circuit, the second sensor connecting path having a normal voltage higher than the reference voltage line, wherein the first overcurrent protection element, the second overcurrent protection element, the third overcurrent protection element, and the fourth overcurrent protection element are each an element that loses conductivity when a current exceeding a predetermined current value flows through, the rectifying element inhibits a flow of current from the first sensor connecting path to the reference voltage line and allows a flow of current from the reference voltage line to the first sensor connecting path, the overvoltage protection element electrically connects the second sensor connecting path to the reference voltage line when a voltage of the second sensor connecting path relative to the reference voltage line exceeds a predetermined voltage value, and the predetermined voltage value is higher than a maximum value of the normal voltage of the second sensor connecting path and lower than a potential difference between the first member and the second member.

The normal voltage referred to herein may be a voltage that can occur in the normal operation of the temperature detection device, and may be fixed to a predetermined value or may change in a predetermined range. The normal voltages of the first sensor connecting path and the second sensor connecting path may be determined mainly by the sensor input circuit.

According to the above-described aspect, the sensor input circuit is protected.

In the above-described aspect, the overvoltage protection element may be a Zener diode, an anode of the Zener diode may be connected to the reference voltage line, a cathode of the Zener diode may be connected to the second sensor connecting path, and a breakdown voltage of the Zener diode may be equal to the predetermined voltage value.

The DC circuit may have a DC power supply, the first member may be a first relay connected to a negative electrode of the DC power supply, and the second member may be a second relay connected to a positive electrode of the DC power supply.

The DC circuit may have a DC power supply, and the first member may be the DC power supply.

The DC circuit may have a DC power supply, and the second member may be the DC power supply.

The DC circuit may have a DC power supply in which a plurality of power supplies are connected in series, the first member may be a negative side of the DC power supply, and the second member may be a positive side of the DC power supply.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

Figure 1:
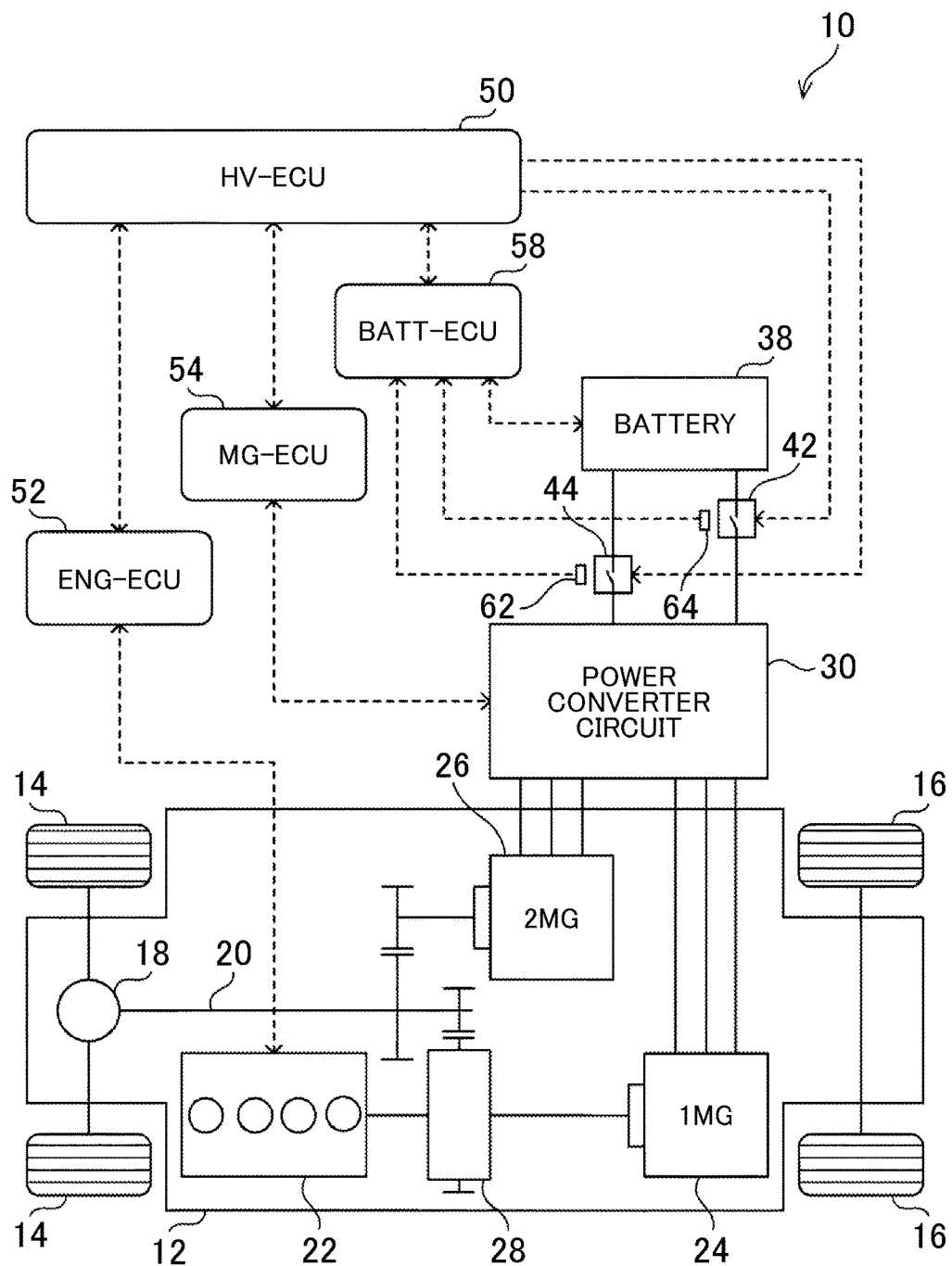
FIG. 1 is a block diagram schematically showing the configuration of a hybrid vehicle 10.

Referring to the drawings, a hybrid vehicle 10 of an embodiment will be described. As shown in FIG. 1, the hybrid vehicle 10 includes a vehicle body 12 and four wheels 14 and 16 that are rotatably supported on the vehicle body 12. The four wheels 14 and 16 include a pair of drive wheels 14 and a pair of driven wheels 16. The pair of drive wheels 14 are connected to an output shaft 20 via a differential gear 18. The output shaft 20 is rotatably supported on the vehicle body 12. As one example, the pair of drive wheels 14 are front wheels located at the front of the vehicle body 12, while the pair of driven wheels 16 are rear wheels located at the rear of the vehicle body 12. The pair of drive wheels 14 are disposed coaxially with each other and the pair of driven wheels 16 are also disposed coaxially with each other.

The hybrid vehicle 10 further includes an engine 22, a first motor generator 24, and a second motor generator 26. Hereinbelow, the first motor generator 24 will be referred to simply as a first motor 24, and the second motor generator 26 will be referred to simply as a second motor 26. The engine 22 is a displacement internal combustion engine and outputs power by burning fuel. The engine 22 is connected to the output shaft 20 and the first motor 24 via a planetary gear mechanism 28. The planetary gear mechanism 28 is a kind of power distribution mechanism and distributes the power output from the engine 22 to the output shaft 20 and the first motor 24. The engine 22 is a power source for driving the drive wheels 14 and is also a power source for driving the first motor 24 that functions as a generator.

The first motor 24 and the second motor 26 are each a three-phase motor generator having U-phase, V-phase, and W-phase. As described above, the first motor 24 is connected to the engine 22 via the planetary gear mechanism 28. The first motor 24 is mainly used as a generator that generates electric power by the power from the engine 22. The first motor 24 is also used as a starter motor for starting the engine 22. The second motor 26 is connected to the output shaft 20 and used as a power source for driving the drive wheels 14. The second motor 26 is also used as a generator that generates electric power by power from the output shaft 20, for example, when the hybrid vehicle 10 is braked.

Figure 2:
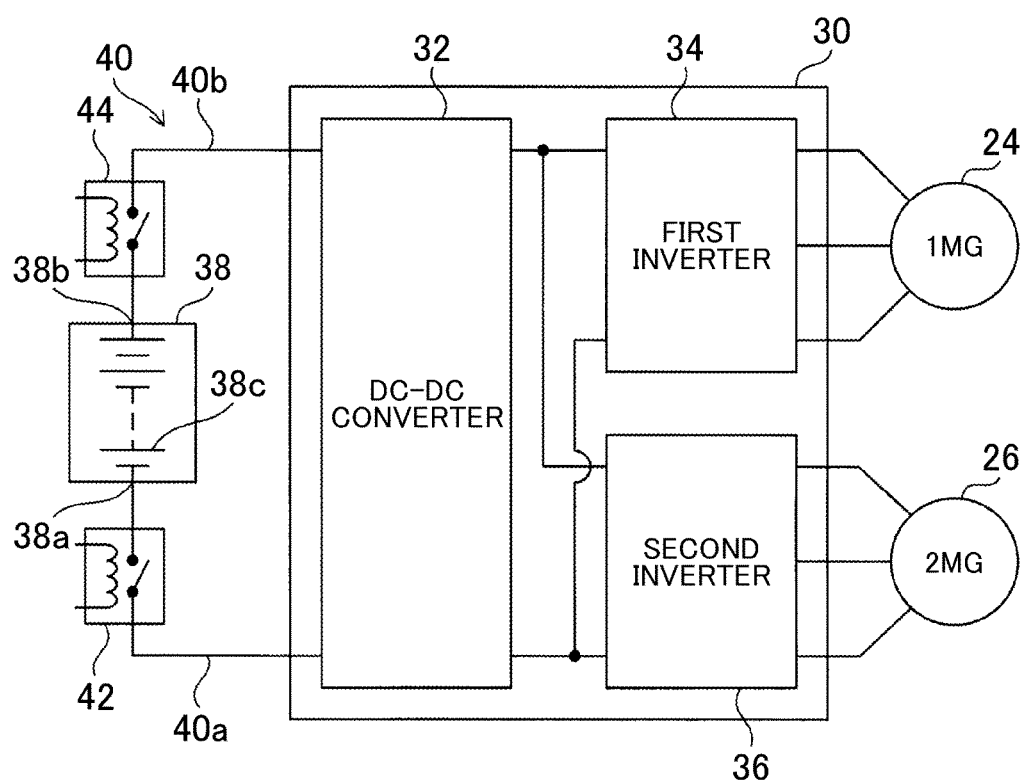
FIG. 2 is a block diagram schematically showing the configuration of a power converter circuit 30.

As shown in FIGS. 1 and 2, the hybrid vehicle 10 further includes a power converter circuit 30 and a battery 38. The battery 38 is electrically connected to the first motor 24 and the second motor 26 via the power converter circuit 30. The battery 38 is a DC power supply having a plurality of secondary battery cells 38c and being capable of repeated charging and discharging. The kind of the secondary battery cells 38c is not particularly limited and may be, for example, a lithium-ion battery or a nickel-hydrogen battery. As one example, in this embodiment, the rated voltage of the battery 38 is about 200V, while the rated voltage of each of the first motor 24 and the second motor 26 is about 600V. That is, the rated voltage of the battery 38 is lower than the rated voltage of each of the first motor 24 and the second motor 26. Specific values of the rated voltages of the battery 38, the first motor 24, and the second motor 26 and their magnitude relationship are not particularly limited.

As shown in FIG. 2, the power converter circuit 30 includes a DC-DC converter 32, a first inverter 34, and a second inverter 36. The DC-DC converter 32 is a DC-DC converter capable of stepping up and down a voltage. The battery 38 is connected to the first motor 24 via the DC-DC converter 32 and the first inverter 34. When the first motor 24 functions as a motor, DC power from the battery 38 is stepped up by the DC-DC converter 32, then converted to AC power by the first inverter 34, and then supplied to the first motor 24. On the other hand, when the first motor 24 functions as a generator, AC power from the first motor 24 is converted to DC power by the first inverter 34, then stepped down by the DC-DC converter 32, and then supplied to the battery 38. Likewise, the battery 38 is connected to the second motor 26 via the DC-DC converter 32 and the second inverter 36. When the second motor 26 functions as a motor, DC power from the battery 38 is stepped up by the DC-DC converter 32, then converted to AC power by the second inverter 36, and then supplied to the second motor 26. On the other hand, when the second motor 26 functions as a generator, AC power from the second motor 26 is converted to DC power by the second inverter 36, then stepped down by the DC-DC converter 32, and then supplied to the battery 38. The configuration of the power converter circuit 30 in this embodiment is only one example, and the configuration of the power converter circuit 30 can be changed as appropriate according to the configurations of the battery 38, the first motor 24, and the second motor 26. For example, when the rated voltage of the battery 38 is the same as the rated voltage of each of the first motor 24 and the second motor 26, the DC-DC converter 32 is not necessarily required.

As shown in FIGS. 1 and 2, the hybrid vehicle 10 includes a first relay 42 and a second relay 44. The first relay 42 is provided on a first power line 40a connecting between a negative electrode 38a of the battery 38 and the power converter circuit 30 and functions to make the first power line 40a electrically continuous and discontinuous. The second relay 44 is provided on a second power line 40b connecting between a positive electrode 38b of the battery 38 and the power converter circuit 30 and functions to make the second power line 40b electrically continuous and discontinuous. The battery 38, the first power line 40a, and the second power line 40b form a DC circuit 40 in which direct current flows, wherein the second relay 44 has a higher potential than the first relay 42. Normally, when the hybrid vehicle 10 is used, the first relay 42 and the second relay 44 are closed, so that the battery 38 is electrically connected to the power converter circuit 30. On the other hand, when the hybrid vehicle 10 is not used, the first relay 42 and the second relay 44 are opened, so that the battery 38 and the power converter circuit 30 are electrically insulated from each other. Although not particularly limited, the first relay 42 and the second relay 44 of this embodiment are each an electromagnetic relay that opens and closes its contact by an electromagnet.

As shown in FIG. 1, the hybrid vehicle 10 further includes a hybrid control unit 50, an engine control unit 52, a motor control unit 54, and a battery control unit 58. These control units form a control part that monitors and controls the operation of the hybrid vehicle 10. The engine control unit 52 mainly monitors and controls the operation of the engine 22. The motor control unit 54 mainly monitors and controls the operation of the power converter circuit 30. Accordingly, the operations of the first motor 24 and the second motor 26 are controlled by the motor control unit 54. The battery control unit 58 mainly monitors and controls the operation of the battery 38. The hybrid control unit 50 is a host control unit that is communicably connected to the engine control unit 52, the motor control unit 54, and the battery control unit 58 and gives operation commands to those control units. For example, according to an accelerator operation by a user, a speed of the hybrid vehicle 10, and so on, the hybrid control unit 50 gives an operation command including a target torque value to each of the engine control unit 52, the motor control unit 54, and the battery control unit 58. Further, the hybrid control unit 50 is electrically connected to the first relay 42 and the second relay 44 and controls the operations of the first relay 42 and the second relay 44. Alternatively, the operations of the first relay 42 and the second relay 44 may be controlled by the battery control unit 58 or another control unit instead of the hybrid control unit 50.

With the configuration described above, in the hybrid vehicle 10 of this embodiment, electric power charged in the battery 38 is supplied to the first motor 24 or the second motor 26 via the power converter circuit 30, or electric power generated by the first motor 24 or the second motor 26 is supplied to the battery 38 via the power converter circuit 30. In either case, current flows through the first relay 42 and the second relay 44, so that the temperatures of the first relay 42 and the second relay 44 increase. Herein, if the temperature of the first relay 42 or the second relay 44 increases too much, there may occur a failure of the first relay 42 or the second relay 44, such as welding of its contact. In view of this, in order to monitor the temperatures of the first relay 42 and the second relay 44, the hybrid vehicle 10 of this embodiment is provided with a temperature detection device 60 which will be described hereinbelow.

Figure 3:
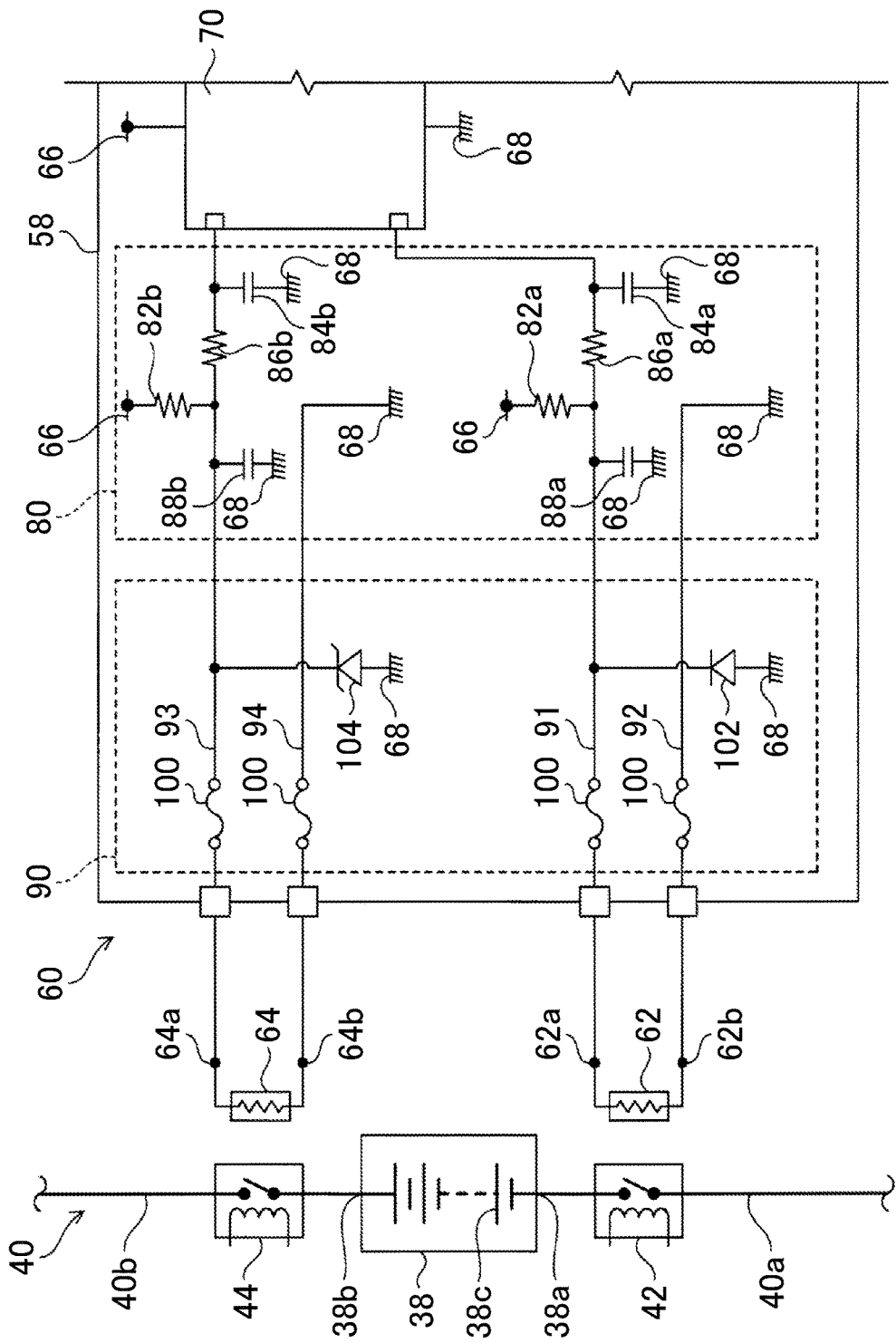
FIG. 3 is a circuit diagram schematically showing the configuration of a temperature detection device 60.

As shown in FIG. 3, the temperature detection device 60 includes a first temperature sensor 62, a second temperature sensor 64, a monitoring circuit 70, a sensor input circuit 80, and a protection circuit 90. The first temperature sensor 62 is a sensor that detects the temperature of the first relay 42. The first temperature sensor 62 is disposed adjacent to the first relay 42 and outputs a detection signal corresponding to the temperature of the first relay 42. The second temperature sensor 64 is a sensor that detects the temperature of the second relay 44. The second temperature sensor 64 is disposed adjacent to the second relay 44 and outputs a detection signal corresponding to the temperature of the second relay 44. Specific configurations of the first temperature sensor 62 and the second temperature sensor 64 are not particularly limited. As one example, the first temperature sensor 62 and the second temperature sensor 64 in this embodiment are each a thermistor whose resistance value changes according to the temperature.

The detection signals from the first temperature sensor 62 and the second temperature sensor 64 are each input to the monitoring circuit 70 via the protection circuit 90 and the sensor input circuit 80. As one example, the monitoring circuit 70 of this embodiment is configured using a microcomputer (or a microprocessor) and disposed in the battery control unit 58. The position and the configuration of the monitoring circuit 70 are not particularly limited, and a part or the whole of the monitoring circuit 70 may be provided in another control unit or another circuit unit. The monitoring circuit 70 is connected to a power supply voltage line 66 and a reference voltage line 68 in the battery control unit 58. Herein, the reference voltage line 68 is electrically connected to ground, so that its potential is kept at 0V. The power supply voltage line 66 is connected to a power supply circuit (not shown) of the battery control unit 58, so that its potential is kept at, for example, 5V.

The sensor input circuit 80 is provided between the first and second temperature sensors 62 and 64 and the monitoring circuit 70. Although the sensor input circuit 80 is provided in the battery control unit 58 in this embodiment, a part or the whole of the sensor input circuit 80 may be provided in another control unit or another circuit unit. The sensor input circuit 80 connects terminals 62a and 62b of the first temperature sensor 62 and terminals 64a and 64b of the second temperature sensor 64 to at least one of the power supply voltage line 66 and the reference voltage line 68. Accordingly, the sensor input circuit 80 supplies necessary electric power to the first temperature sensor 62 and the second temperature sensor 64 and suppresses noise that occurs in detection signals of the first and second temperature sensors 62 and 64. A specific configuration of the sensor input circuit 80 is not particularly limited. As one example, in the sensor input circuit 80 of this embodiment, the one terminal 62a of the first temperature sensor 62 is connected to the power supply voltage line 66 via a pull-up resistor 82a and connected to the reference voltage line 68 via two capacitors 84a and 88a. Further, the one terminal 62a of the first temperature sensor 62 is connected to the monitoring circuit 70 via a resistor 86a. On the other hand, the other terminal 62b of the first temperature sensor 62 is directly connected to the reference voltage line 68 not via a resistor, a capacitor, or the like in the sensor input circuit 80. As described above, the first temperature sensor 62 in this embodiment is the thermistor. Therefore, according to the sensor input circuit 80 configured as described above, the voltage between the terminals 62a and 62b of the first temperature sensor 62 changes according to the temperature of the first relay 42. As a result, a detection signal having a voltage value corresponding to the temperature of the first relay 42 is input to the monitoring circuit 70 from the sensor input circuit 80.

Likewise, in the sensor input circuit 80, the one terminal 64a of the second temperature sensor 64 is connected to the power supply voltage line 66 via a pull-up resistor 82b and connected to the reference voltage line 68 via two capacitors 84b and 88b. Further, the one terminal 64a of the second temperature sensor 64 is connected to the monitoring circuit 70 via a resistor 86b. On the other hand, the other terminal 64b of the second temperature sensor 64 is directly connected to the reference voltage line 68 not via a resistor, a capacitor, or the like in the sensor input circuit 80. As described above, the second temperature sensor 64 is also the thermistor in this embodiment. Therefore, according to the sensor input circuit 80 configured as described above, the voltage between the terminals 64a and 64b of the second temperature sensor 64 changes according to the temperature of the second relay 44. As a result, a detection signal having a voltage value corresponding to the temperature of the second relay 44 is input to the monitoring circuit 70 from the sensor input circuit 80.

The monitoring circuit 70 detects overheating of the first relay 42 by monitoring the detection signal of the first temperature sensor 62 and detects overheating of the second relay 44 by monitoring the detection signal of the second temperature sensor 64. Upon detection of the overheating of the first relay 42 or the second relay 44, the monitoring circuit 70 sends a predetermined alarm signal to the hybrid control unit 50. In response to receipt of the alarm signal, the hybrid control unit 50 performs a predetermined protection operation in order to prevent further overheating of the first relay 42 or the second relay 44. For example, as one of protection operations, the hybrid control unit 50 limits a target torque value to be commanded to the motor control unit 54. Consequently, current flowing through the first relay 42 and the second relay 44 decreases to suppress a temperature rise of the first relay 42 and the second relay 44, so that a failure, such as welding, of the first relay 42 and the second relay 44 is prevented.

In the temperature detection device 60 of this embodiment, since the first temperature sensor 62 is disposed adjacent to the first relay 42, there is a possibility of the occurrence of unintended continuity between the first temperature sensor 62 and the first relay 42. Likewise, there is a possibility of the occurrence of unintended continuity also between the second temperature sensor 64 and the second relay 44. Herein, when the unintended continuity between the first temperature sensor 62 and the first relay 42 and the unintended continuity between the second temperature sensor 64 and the second relay 44 occur simultaneously, there is a possibility that a short-circuit current may flow into the sensor input circuit 80 from the DC circuit 40 (particularly the battery 38) to damage the sensor input circuit 80. Therefore, in the temperature detection device 60 of this embodiment, the protection circuit 90 is provided for protecting the sensor input circuit 80. The protection circuit 90 is provided between the first and second temperature sensors 62 and 64 and the sensor input circuit 80. Although the protection circuit 90 is provided in the battery control unit 58 in this embodiment, a part or the whole of the protection circuit 90 may be provided in another control unit or another circuit unit.

The protection circuit 90 includes a plurality of first sensor connecting paths 91 and 92, a plurality of second sensor connecting paths 93 and 94, a first diode 102, and a second diode 104. Each of the first sensor connecting paths 91 and 92 has at least one overcurrent protection element 100. The first sensor connecting paths 91 and 92 respectively connect the terminals 62a and 62b of the first temperature sensor 62 to the sensor input circuit 80. Likewise, the second sensor connecting paths 93 and 94 each have at least one overcurrent protection element 100 and respectively connect the terminals 64a and 64b of the second temperature sensor 64 to the sensor input circuit 80. Each overcurrent protection element 100 is an element that loses conductivity when a current exceeding a predetermined current value flows through. This predetermined current value is set to be greater than a value of current that flows in each of the sensor connecting paths 91 to 94 in the normal operation of the temperature detection device 60. As one example, the overcurrent protection element 100 in this embodiment is a fuse that blows when the current exceeding the predetermined current value flows through. Alternatively, the overcurrent protection element 100 may be another kind of interrupting element or interrupting device.

Of the first sensor connecting paths 91 and 92, the normal voltage of the first sensor connecting path 91 connected to the one terminal 62a of the first temperature sensor 62 becomes higher than the normal voltage of the reference voltage line 68. On the other hand, the normal voltage of the first sensor connecting path 92 connected to the other terminal 62b of the first temperature sensor 62 becomes equal to the normal voltage of the reference voltage line 68. The normal voltage referred to herein is a voltage that can occur in the normal operation of the temperature detection device 60, and is fixed to a predetermined value or changes in a predetermined range. In this specification, the first sensor connecting path 91 whose normal voltage is higher than the reference voltage line 68 will be referred to as the specific first sensor connecting path 91 so as to be distinguished from the other first sensor connecting path 92 for convenience. The specific first sensor connecting path 91 is connected to the reference voltage line 68 via the first diode 102 in a section between the overcurrent protection element 100 and the sensor input circuit 80.

The anode of the first diode 102 is connected to the reference voltage line 68. The cathode of the first diode 102 is connected to the specific first sensor connecting path 91. Consequently, the first diode 102 inhibits the flow of current from the specific first sensor connecting path 91 to the reference voltage line 68 and allows the flow of current from the reference voltage line 68 to the specific first sensor connecting path 91. The breakdown voltage of the first diode 102 is higher than a maximum value of the normal voltage of the specific first sensor connecting path 91. With this configuration, there is no possibility that the specific first sensor connecting path 91 is electrically connected to the reference voltage line 68 via the first diode 102 in the normal operation of the temperature detection device 60. Accordingly, a detection signal of the first temperature sensor 62 is correctly input to the monitoring circuit 70 via the sensor input circuit 80. In contrast, when the potential of the reference voltage line 68 becomes higher than that of the specific first sensor connecting path 91, the reference voltage line 68 is electrically connected to the specific first sensor connecting path 91 via the first diode 102. The first diode 102 may be a Zener diode or may be otherwise.

Of the second sensor connecting paths 93 and 94, the normal voltage of the second sensor connecting path 93 connected to the one terminal 64a of the second temperature sensor 64 becomes higher than the normal voltage of the reference voltage line 68. On the other hand, the normal voltage of the second sensor connecting path 94 connected to the other terminal 64b of the second temperature sensor 64 becomes equal to the normal voltage of the reference voltage line 68. In this specification, the second sensor connecting path 93 whose normal voltage is higher than the reference voltage line 68 will be referred to as the specific second sensor connecting path 93 so as to be distinguished from the other second sensor connecting path 94 for convenience. The specific second sensor connecting path 93 is connected to the reference voltage line 68 via the second diode 104 in a section between the overcurrent protection element 100 and the sensor input circuit 80. The second diode 104 is one example of an overvoltage protection element.

The anode of the second diode 104 is connected to the reference voltage line 68. The cathode of the second diode 104 is connected to the specific second sensor connecting path 93. The breakdown voltage of the second diode 104 is higher than a maximum value of the normal voltage of the specific second sensor connecting path 93, but is lower than a potential difference between the first relay 42 and the second relay 44. With this configuration, there is no possibility that the specific second sensor connecting path 93 is electrically connected to the reference voltage line 68 via the second diode 104 in the normal operation of the temperature detection device 60. Accordingly, a detection signal of the second temperature sensor 64 is correctly input to the monitoring circuit 70 via the sensor input circuit 80. On the other hand, when the voltage of the specific second sensor connecting path 93 relative to the reference voltage line 68 exceeds the breakdown voltage of the second diode 104, the specific second sensor connecting path 93 is electrically connected to the reference voltage line 68 via the second diode 104. The second diode 104 in this embodiment is a Zener diode. However, as long as the second diode 104 has a suitable breakdown voltage, the second diode 104 is not limited to the Zener diode.

It is assumed that an unintended continuity between the first temperature sensor 62 and the first relay 42 and an unintended continuity between the second temperature sensor 64 and the second relay 44 occur simultaneously in the configuration described above. In this case, at least one of the first sensor connecting paths 91 and 92 is electrically connected to the first relay 42, and at least one of the second sensor connecting paths 93 and 94 is electrically connected to the second relay 44. As a result, a DC voltage by the battery 38 is applied between the at least one of the first sensor connecting paths 91 and 92 and the at least one of the second sensor connecting paths 93 and 94 from the DC circuit 40.

Figure 4:
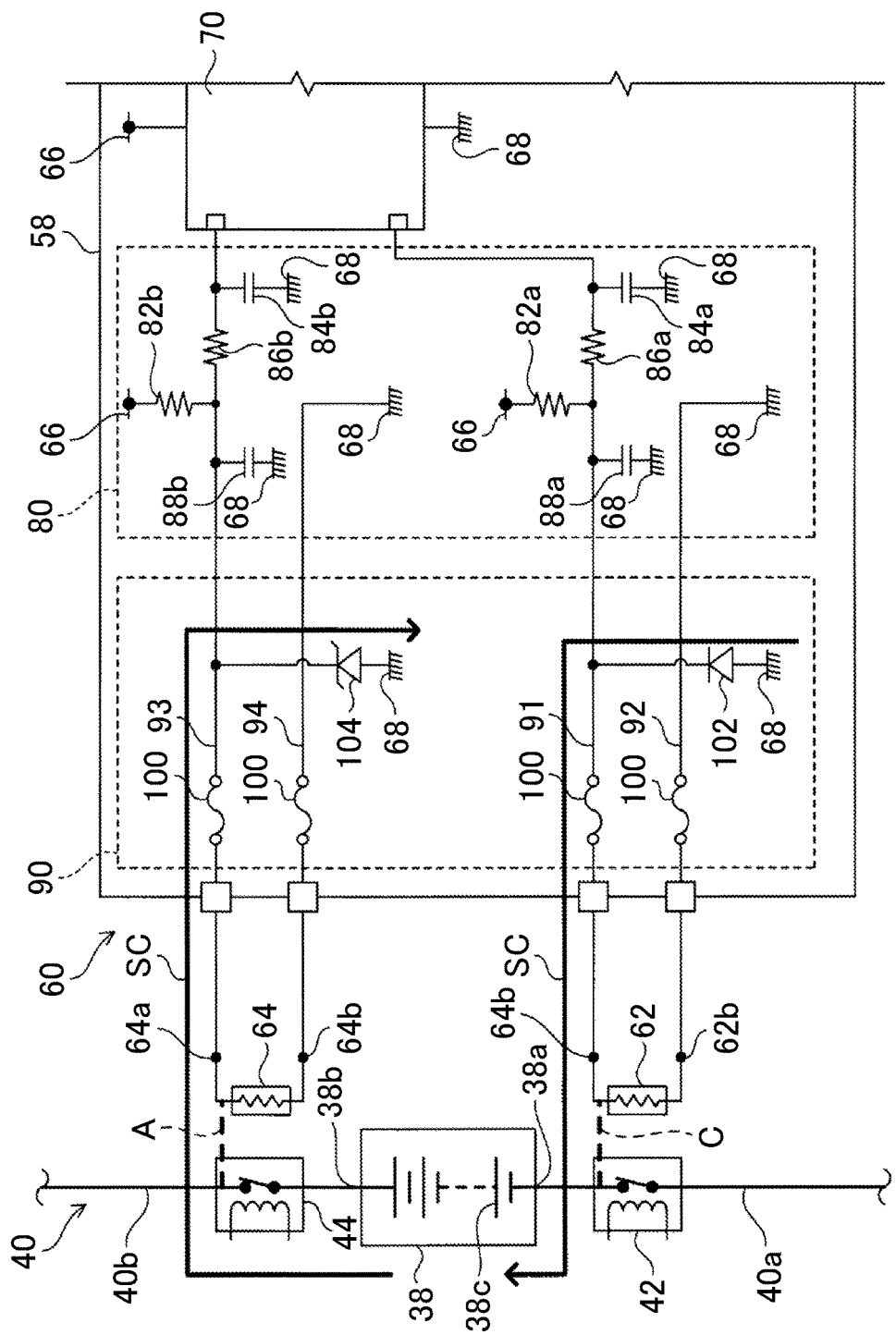
FIG. 4 is a diagram showing a path of a short-circuit current SC that flows from a specific second sensor connecting path 93 to a specific first sensor connecting path 91.

For example, as shown in FIG. 4, it is assumed that an unintended continuity between the first temperature sensor 62 and the first relay 42 occurs on the one terminal 62a side (position C in FIG. 4) of the first temperature sensor 62 and that an unintended continuity between the second temperature sensor 64 and the second relay 44 occurs on the one terminal 64a side (position A in FIG. 4) of the second temperature sensor 64. In this case, a DC voltage by the battery 38 is applied between the first sensor connecting path 91 connected to the one terminal 62a of the first temperature sensor 62 and the second sensor connecting path 93 connected to the one terminal 64a of the second temperature sensor 64. Accordingly, the voltage exceeding the breakdown voltage is applied to the second diode 104 in the reverse direction. Therefore, the second sensor connecting path 93 is electrically connected to the reference voltage line 68 via the second diode 104. When the second sensor connecting path 93 is electrically connected to the reference voltage line 68, the potential of the reference voltage line 68 becomes higher than that of the first sensor connecting path 91. Therefore, the reference voltage line 68 is electrically connected to the first sensor connecting path 91 via the first diode 102. As a result, as shown in FIG. 4, a short-circuit current SC by the DC circuit 40 flows from the second sensor connecting path 93, through the second diode 104, the reference voltage line 68, and the first diode 102 in this order, into the first sensor connecting path 91. Since the various elements (e.g. the pull-up resistors 82a and 82b) of the sensor input circuit 80 do not exist in the path in which the short-circuit current SC flows, the sensor input circuit 80 is prevented from being damaged. When the short-circuit current SC flows, the overcurrent protection elements 100 of the first sensor connecting path 91 and the second sensor connecting path 93 lose the conductivity, so that the first sensor connecting path 91 and the second sensor connecting path 93 are electrically interrupted. Consequently, the positions C and A of the unintended continuity that have occurred at the first temperature sensor 62 and the second temperature sensor 64 are electrically interrupted from the sensor input circuit 80.

Figure 5:
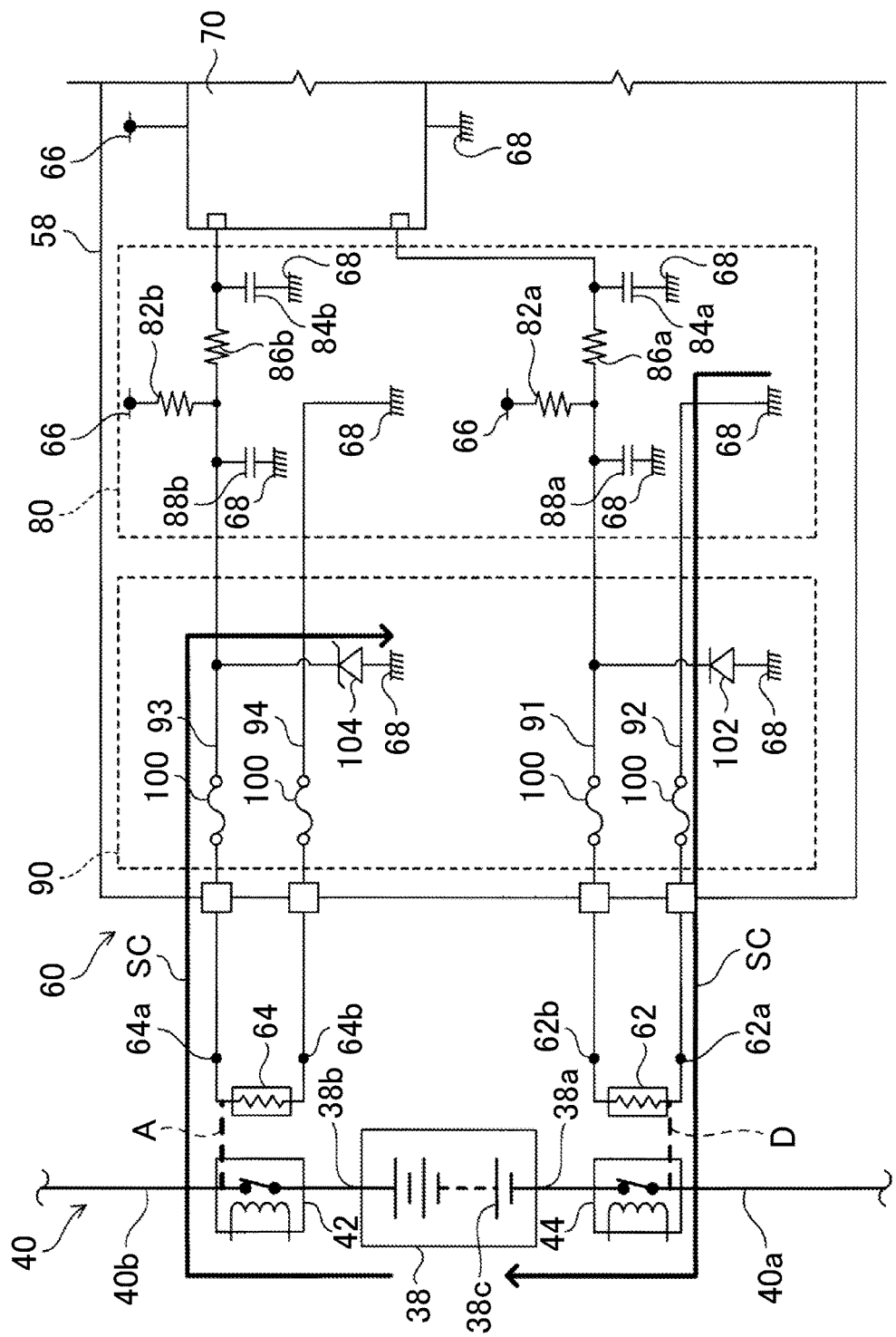
FIG. 5 is a diagram showing a path of a short-circuit current SC that flows from the specific second sensor connecting path 93 to the other first sensor connecting path 92.

Alternatively, as shown in FIG. 5, it is assumed that an unintended continuity between the first temperature sensor 62 and the first relay 42 occurs on the other terminal 62b side (position D in FIG. 5) of the first temperature sensor 62 and that an unintended continuity between the second temperature sensor 64 and the second relay 44 occurs on the one terminal 64a side (position A in FIG. 5) of the second temperature sensor 64. In this case, a DC voltage by the battery 38 is applied between the first sensor connecting path 92 connected to the other terminal 62b of the first temperature sensor 62 and the second sensor connecting path 93 connected to the one terminal 64a of the second temperature sensor 64. Accordingly, the voltage exceeding the breakdown voltage is applied to the second diode 104 in the reverse direction. Therefore, the second sensor connecting path 93 is electrically connected to the reference voltage line 68 via the second diode 104. On the other hand, the first sensor connecting path 92 is directly connected to the reference voltage line 68 in the sensor input circuit 80. As a result, as shown in FIG. 5, a short-circuit current SC by the DC circuit 40 flows from the second sensor connecting path 93, through the second diode 104 and the reference voltage line 68 in this order, into the first sensor connecting path 92. Since the various elements of the sensor input circuit 80 do not exist also in the path in which this short-circuit current SC flows, the sensor input circuit 80 is prevented from being damaged. When the short-circuit current SC flows, the overcurrent protection elements 100 of the first sensor connecting path 92 and the second sensor connecting path 93 lose the conductivity, so that the first sensor connecting path 92 and the second sensor connecting path 93 are electrically interrupted. Consequently, the positions D and A of the unintended continuity that have occurred at the first temperature sensor 62 and the second temperature sensor 64 are electrically interrupted from the sensor input circuit 80.

Figure 6:
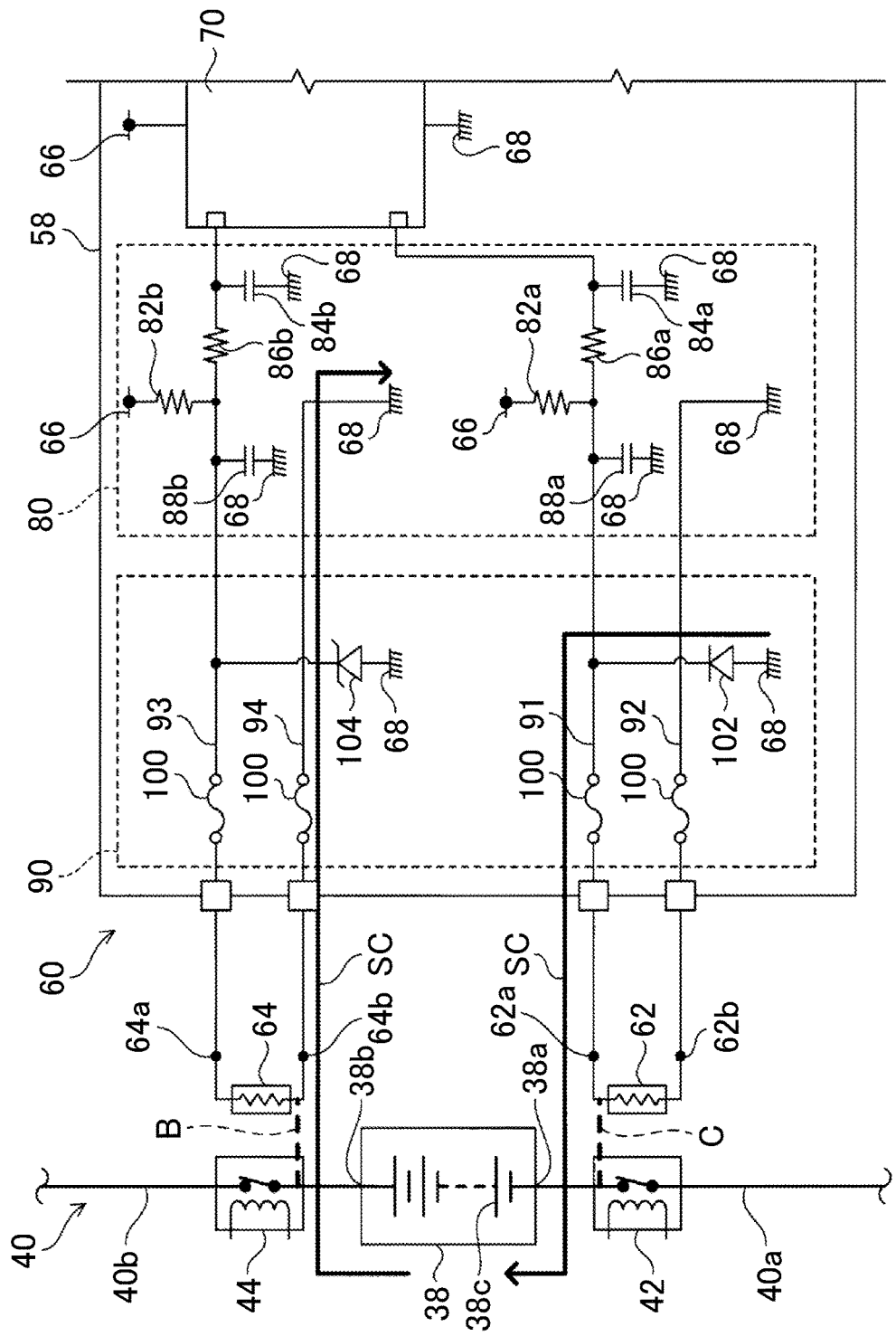
FIG. 6 is a diagram showing a path of a short-circuit current SC that flows from the other second sensor connecting path 94 to the specific first sensor connecting path 91.

Alternatively, as shown in FIG. 6, it is assumed that an unintended continuity between the first temperature sensor 62 and the first relay 42 occurs on the one terminal 62a side (position C in FIG. 6) of the first temperature sensor 62 and that an unintended continuity between the second temperature sensor 64 and the second relay 44 occurs on the other terminal 64b side (position B in FIG. 6) of the second temperature sensor 64. In this case, a DC voltage by the battery 38 is applied between the first sensor connecting path 91 connected to the one terminal 62a of the first temperature sensor 62 and the second sensor connecting path 94 connected to the other terminal 64b of the second temperature sensor 64. The second sensor connecting path 94 is directly connected to the reference voltage line 68 in the sensor input circuit 80. Accordingly, the potential of the reference voltage line 68 becomes higher than that of the first sensor connecting path 91, so that the reference voltage line 68 is electrically connected to the first sensor connecting path 91 via the first diode 102. As a result, as shown in FIG. 6, a short-circuit current SC by the DC circuit 40 flows from the second sensor connecting path 94, through the reference voltage line 68 and the first diode 102 in this order, into the first sensor connecting path 91. Since the various elements of the sensor input circuit 80 do not exist also in the path in which this short-circuit current SC flows, the sensor input circuit 80 is prevented from being damaged. When the short-circuit current SC flows, the overcurrent protection elements 100 of the first sensor connecting path 91 and the second sensor connecting path 94 lose the conductivity, so that the first sensor connecting path 91 and the second sensor connecting path 94 are electrically interrupted. Consequently, the positions C and B of the unintended continuity that have occurred at the first temperature sensor 62 and the second temperature sensor 64 are electrically interrupted from the sensor input circuit 80.

Figure 7:
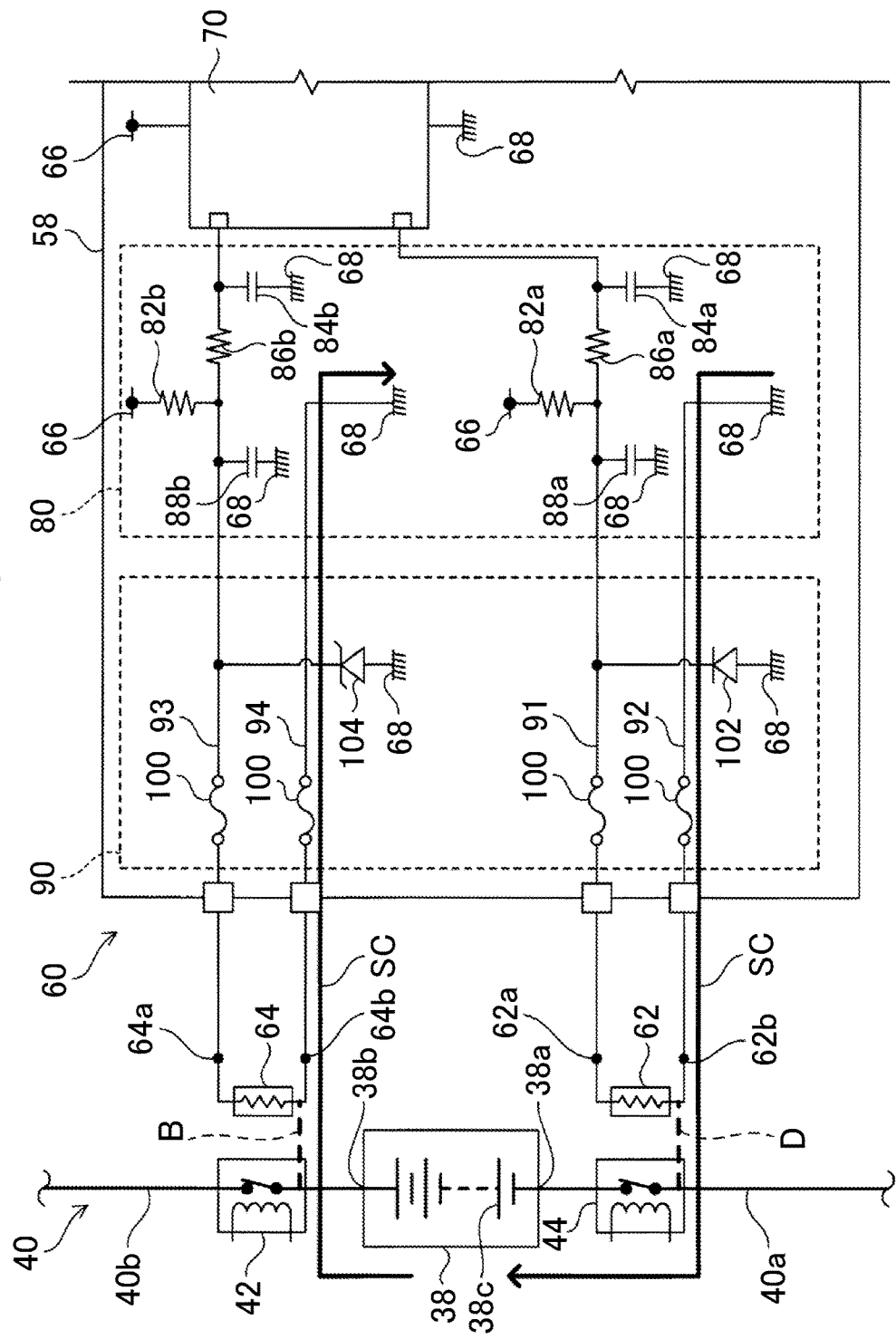
FIG. 7 is a diagram showing a path of a short-circuit current SC that flows from the other second sensor connecting path 94 to the other first sensor connecting path 92.

Alternatively, as shown in FIG. 7, it is assumed that an unintended continuity between the first temperature sensor 62 and the first relay 42 occurs on the other terminal 62b side (position D in FIG. 7) of the first temperature sensor 62 and that an unintended continuity between the second temperature sensor 64 and the second relay 44 occurs on the other terminal 64b side (position B in FIG. 7) of the second temperature sensor 64. In this case, a DC voltage by the battery 38 is applied between the first sensor connecting path 92 connected to the other terminal 62b of the first temperature sensor 62 and the second sensor connecting path 94 connected to the other terminal 64b of the second temperature sensor 64. The first sensor connecting path 92 is directly connected to the reference voltage line 68 in the sensor input circuit 80. Likewise, the second sensor connecting path 94 is also directly connected to the reference voltage line 68 in the sensor input circuit 80. As a result, as shown in FIG. 7, a short-circuit current SC by the DC circuit 40 flows from the second sensor connecting path 94, through the reference voltage line 68, into the first sensor connecting path 92. Since the various elements of the sensor input circuit 80 do not exist also in the path in which this short-circuit current SC flows, the sensor input circuit 80 is prevented from being damaged. When the short-circuit current SC flows, the overcurrent protection elements 100 of the first sensor connecting path 92 and the second sensor connecting path 94 lose the conductivity, so that the first sensor connecting path 92 and the second sensor connecting path 94 are electrically interrupted. Consequently, the positions D and B of the unintended continuity that have occurred at the first temperature sensor 62 and the second temperature sensor 64 are electrically interrupted from the sensor input circuit 80. Depending on the positions of unintended continuity that occur at the first temperature sensor 62 and the second temperature sensor 64, two or more of the short-circuit currents SC shown in FIGS. 4 to 7 may occur simultaneously.

As described above, according to the protection circuit 90 of this embodiment, when an unintended continuity between the first temperature sensor 62 and the first relay 42 and an unintended continuity between the second temperature sensor 64 and the second relay 44 occur simultaneously, the path in which a short-circuit current SC flows is formed in a manner not to damage the sensor input circuit 80. In the path in which the short-circuit current SC flows, the overcurrent protection elements 100 are provided such that the overcurrent protection elements 100 lose the conductivity to quickly interrupt the sensor input circuit 80 from the DC circuit 40.

In the protection circuit 90 described above, only the first sensor connecting path 91, of the first sensor connecting paths 91 and 92, is connected to the reference voltage line 68 via the first diode 102. However, when the normal voltage of the other first sensor connecting path 92 is higher than the normal voltage of the reference voltage line 68, the other first sensor connecting path 92 may also be connected to the reference voltage line 68 via another first diode 102. For example, when the other terminal 62b of the first temperature sensor 62 is connected to the reference voltage line 68 via a resistor or the like in the sensor input circuit 80, the normal voltage of the other first sensor connecting path 92 also becomes higher than the normal voltage of the reference voltage line 68. Likewise, when the normal voltage of the second sensor connecting path 94 connected to the other terminal 64b of the second temperature sensor 64 is higher than the normal voltage of the reference voltage line 68, the second sensor connecting path 94 may also be connected to the reference voltage line 68 via another second diode 104.

Figure 8:
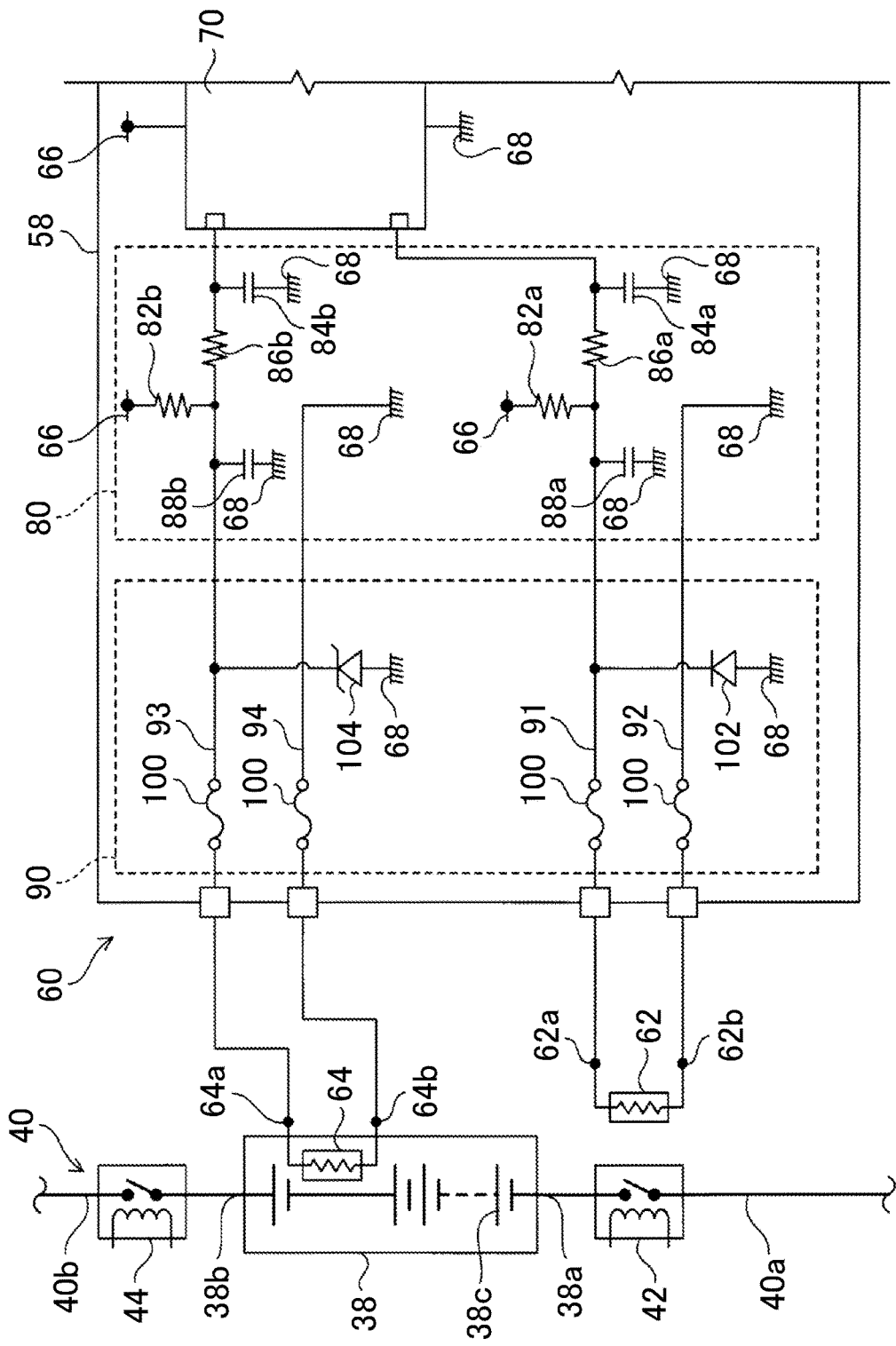
FIG. 8 is a diagram showing a temperature detection device 60 of which a second temperature sensor 64 is disposed in a battery 38.
Figure 9:
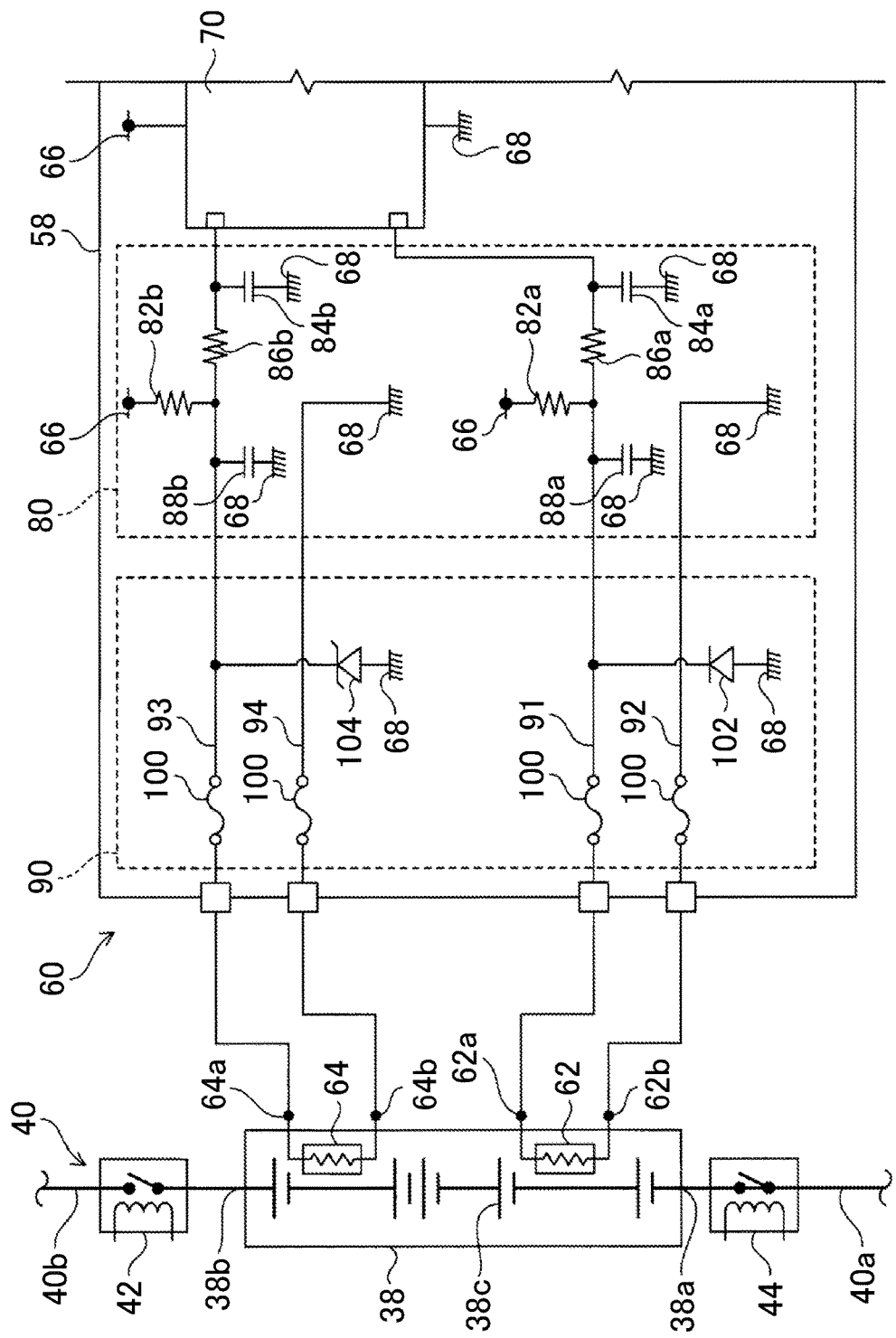
FIG. 9 is a diagram showing a temperature detection device 60 of which a first temperature sensor 62 and a second temperature sensor 64 are both disposed in a battery 38.

The temperature detection device 60 of this embodiment is not limited to the use of detecting the temperatures of the first relay 42 and the second relay 44. For example, as shown in FIGS. 8 and 9, by disposing at least one of the first temperature sensor 62 and the second temperature sensor 64 so as to be adjacent to the battery 38, it is possible to detect the temperature of the secondary battery cells 38c forming the battery 38 or the temperature of a conductive member connected to the secondary battery cells 38c. Further, the temperature detection device 60 of this embodiment is not limited to the hybrid vehicle 10 and is also applicable to a battery vehicle not having the engine 22 and to a fuel cell vehicle having a fuel cell as a DC power supply. Further, the temperature detection device 60 of this embodiment is not necessarily limited to one that is mounted on a vehicle. The temperature detection device 60 of this embodiment can be widely adopted for detecting the temperatures of two members having a potential difference in various DC circuits.

Figure 10:
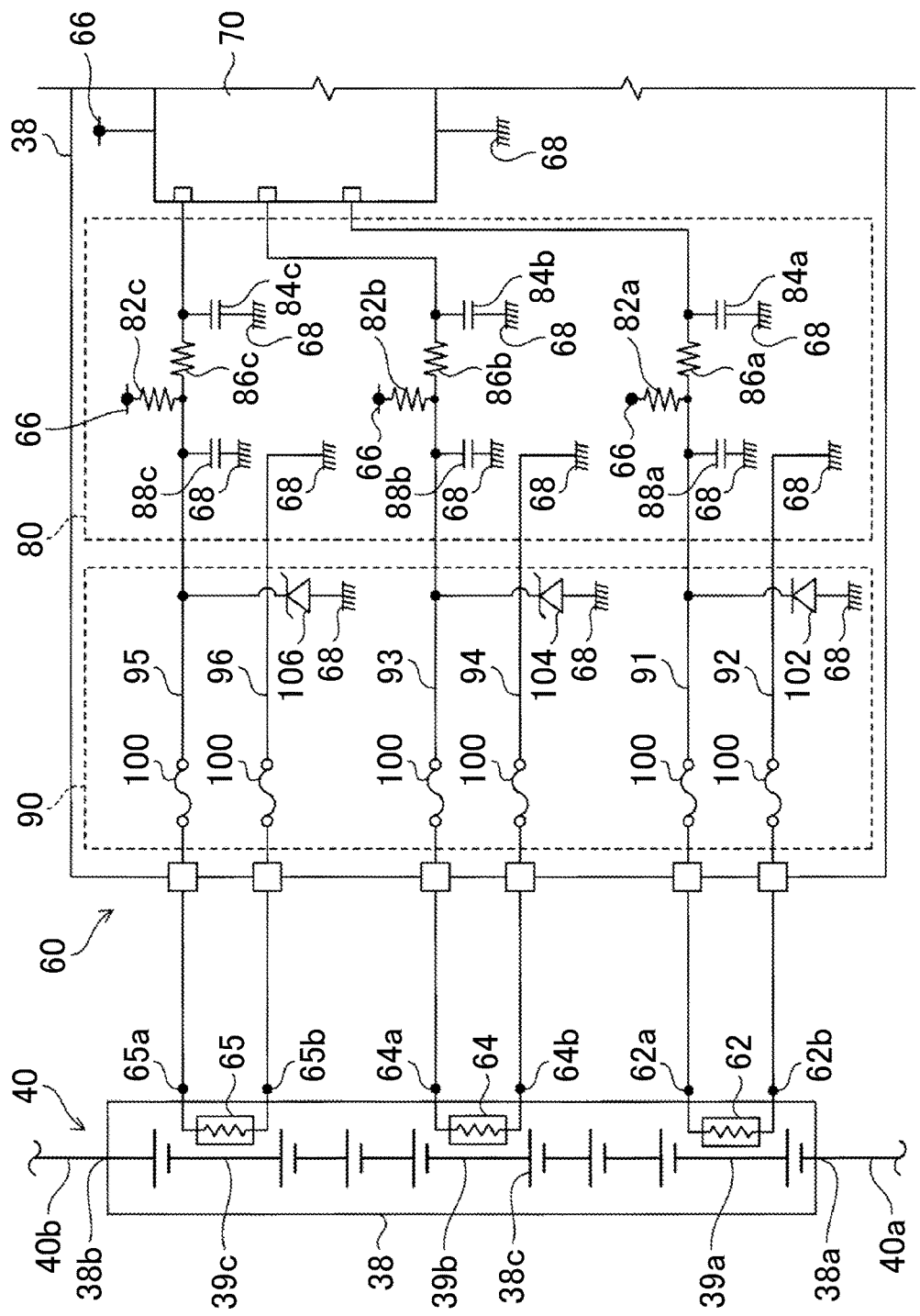
FIG. 10 is a diagram showing a temperature detection device 60 added with a third temperature sensor 65.

The temperature detection device 60 may include three or more temperature sensors so as to detect the temperatures of three or more members of the DC circuit 40, respectively. FIG. 10 shows a modification of the temperature detection device 60, wherein there is shown a temperature detection device 60 added with a third temperature sensor 65. In the temperature detection device 60 shown in FIG. 10, a first temperature sensor 62 is disposed adjacent to a first member 39a in a battery 38, a second temperature sensor 64 is disposed adjacent to a second member 39b in the battery 38, and the third temperature sensor 65 is disposed adjacent to a third member 39c in the battery 38. A plurality of secondary battery cells 38c are disposed between the first member 39a and the second member 39b such that the second member 39b has a higher potential than the first member 39a. A plurality of secondary battery cells 38c are disposed also between the second member 39b and the third member 39c such that the third member 39c has a higher potential than the second member 39b.

The configurations of a sensor input circuit 80 and a protection circuit 90 for the third temperature sensor 65 are the same as the configurations of the sensor input circuit 80 and the protection circuit 90 for the second temperature sensor 64. That is, in the sensor input circuit 80, one terminal 65a of the third temperature sensor 65 is connected to a power supply voltage line 66 via a pull-up resistor 82c and connected to a reference voltage line 68 via two capacitors 84c and 88c. Further, the sensor input circuit 80 connects the one terminal 65a of the third temperature sensor 65 to a monitoring circuit 70 via a resistor 86c. On the other hand, the other terminal 65b of the third temperature sensor 65 is directly connected to the reference voltage line 68 not via a resistor, a capacitor, or the like in the sensor input circuit 80. The protection circuit 90 includes a plurality of third sensor connecting paths 95 and 96. The third sensor connecting paths 95 and 96 each have at least one overcurrent protection element 100 and respectively connect the terminals 65a and 65b of the third temperature sensor 65 to the sensor input circuit 80.

Of the third sensor connecting paths 95 and 96, the third sensor connecting path 95 whose normal voltage differs from the reference voltage line 68 is connected to the reference voltage line 68 via a third diode 106 in a section between the overcurrent protection element 100 and the sensor input circuit 80. In this specification, the third sensor connecting path 95 whose normal voltage differs from the reference voltage line 68 may be referred to as the specific third sensor connecting path 95. The anode of the third diode 106 is connected to the reference voltage line 68. The cathode of the third diode 106 is connected to the specific third sensor connecting path 95. The breakdown voltage of the third diode 106 is higher than a maximum value of the normal voltage of the specific third sensor connecting path 95, but is lower than a potential difference between the second member 39b and the third member 39c. A Zener diode, for example, can be employed as the third diode 106.

According to the configuration described above, even when unintended continuity occur at two or more of the three temperature sensors 62, 64, and 65, damage to the sensor input circuit 80 can be prevented by the protection circuit 90. This also applies to a case where the temperature detection device 60 includes four or more temperature sensors. In this case, the temperature sensor that measures the temperature of a member with the lowest potential may employ the same configuration as the first temperature sensor 62 (i.e. the configuration using the first diode 102), while the other temperature sensors may employ the same configuration as the second temperature sensor 64 or the third temperature sensor 65 (i.e. the configuration using the second diode 104 or the third diode 106).

The first relay 42 described in the embodiment is one example of a first member. The second relay 44 described in the embodiment is one example of a second member. The battery 38 described in the embodiment is one example of a DC power supply. The first diode 102 described in the embodiment is one example of a rectifying element. The second diode 104 described in the embodiment is one example of an overvoltage protection element. The breakdown voltage of the second diode 104 is one example of a predetermined voltage value.

The technical factors of the embodiment described above will be described below. The technical factors described below are all useful independently.

In a temperature detection device disclosed in this specification, an overvoltage protection element may be a Zener diode. In this case, the anode of the Zener diode may be connected to a reference voltage line, the cathode of the Zener diode may be connected to a specific second sensor connecting path, and the breakdown voltage of the Zener diode may be higher than a maximum value of the normal voltage of the specific second sensor connecting path, but may be lower than a potential difference between a first member and a second member. The Zener diode is designed with a relatively accurate breakdown voltage. By employing the Zener diode as the overvoltage protection element, the function required for the overvoltage protection element can be suitably obtained.

A temperature detection device disclosed in this specification can be applied to a DC circuit having a DC power supply. In this case, a first member adjacent to which a first temperature sensor is disposed may be a first relay connected to a negative electrode of the DC power supply, while a second member adjacent to which a second temperature sensor is disposed may be a second relay connected to a positive electrode of the DC power supply. By detecting the temperatures of the first and second relays through which a relatively large current flows, it is possible to avoid or reduce a failure, such as welding, of the first and second relays.

What is claimed is:

1. A temperature detection device comprising:
a first temperature sensor that is disposed adjacent to a first member in a DC circuit;
a second temperature sensor that is disposed adjacent to a second member in the DC circuit, the second member having a higher potential than the first member;
a sensor input circuit that connects a first terminal of the first temperature sensor and a second terminal of the second temperature sensor to a power supply voltage line and that connects a third terminal of the first temperature sensor and a fourth terminal of the second temperature sensor to a reference voltage line; and
a protection circuit that is provided between the first and second temperature sensors and the sensor input circuit, the protection circuit including:
a first sensor connecting path having a first overcurrent protection element and connecting the first terminal to the power supply voltage line;
a second sensor connecting path having a second overcurrent protection element and connecting the second terminal to the power supply voltage line;
a third sensor connecting path having a third overcurrent protection element and connecting the third terminal to the reference voltage line of;
a fourth sensor connecting path having a fourth overcurrent protection element and connecting the fourth terminal to the reference voltage line;
a rectifying element connecting the first sensor connecting path to the reference voltage line in a section between the first overcurrent protection element and the sensor input circuit, the first sensor connecting path having a normal voltage higher than the reference voltage line, the rectifying element inhibiting flow of current from the first sensor connecting path to the reference voltage line and allowing flow of current from the reference voltage line to the first sensor connecting path; and an overvoltage protection element connecting the second sensor connecting path to the reference voltage line in a section between the second overcurrent protection element and the sensor input circuit, the second sensor connecting path having a normal voltage higher than the reference voltage line, the overvoltage protection element electrically connecting the second sensor connecting path to the reference voltage line when a voltage of the second sensor connecting path relative to the reference voltage line exceeds a predetermined voltage value, the predetermined voltage value being higher than a maximum value of the normal voltage of the second sensor connecting path and lower than a potential difference between the first member and the second member, wherein the first overcurrent protection element, the second overcurrent protection element, the third overcurrent protection element, and the fourth overcurrent protection element each lose conductivity when a current exceeding a predetermined current value flows therethrough.

2. The temperature detection device according to claim 1, wherein the overvoltage protection element is a Zener diode,
an anode of the Zener diode is connected to the reference voltage line,
a cathode of the Zener diode is connected to the second sensor connecting path, and
a breakdown voltage of the Zener diode is equal to the predetermined voltage value.

3. The temperature detection device according to claim 1, wherein the DC circuit has a DC power supply,
the first member is a first relay connected to a negative electrode of the DC power supply, and
the second member is a second relay connected to a positive electrode of the DC power supply.

4. The temperature detection device according to claim 1, wherein the DC circuit has a DC power supply, and
the first member is the DC power supply.

5. The temperature detection device according to claim 1, wherein the DC circuit has a DC power supply, and
the second member is the DC power supply.

6. The temperature detection device according to claim 1, wherein the DC circuit has a DC power supply in which a plurality of power supplies are connected in series,
the first member is a negative side of the DC power supply, and
the second member is a positive side of the DC power supply.

7. The temperature detection device according to claim 1, wherein the first overcurrent protection element, the second overcurrent protection element, the third overcurrent protection element, and the fourth overcurrent protection element each lose conductivity when a short-circuit current flows therethrough.

* * * * *